US012763880B2

(12) United States Patent
Han et al.

(10) Patent No.: US 12,763,880 B2
(45) Date of Patent: Oct. 13, 2026

(54) COMMUNICATION METHOD, DEVICE, STORAGE MEDIUM, AND COMPUTER PROGRAM PRODUCT

(71) Applicant: HUAWEI TECHNOLOGIES CO., LTD., Shenzhen (CN)

(72) Inventors: Yunfeng Han, Suzhou (CN); Lin Gao, Shenzhen (CN); Huawei Yue, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 18/890,738

(22) Filed: Sep. 19, 2024

(65) Prior Publication Data

US 2025/0015926 A1 Jan. 9, 2025

Related U.S. Application Data

(63) Continuation of application No. PCT/CN2022/082254, filed on Mar. 22, 2022.

(51) Int. Cl.
*H04L 1/00* (2006.01)
*H04L 1/1607* (2023.01)
(Continued)

(52) U.S. Cl.
CPC .......... *H04L 1/0073* (2013.01); *H04L 1/0081* (2013.01); *H04L 1/1614* (2013.01);
(Continued)

(58) Field of Classification Search
CPC ... H04L 1/0073; H04L 1/0081; H04L 1/1614; H04L 1/1671; H04L 1/1864; H04L 1/1896; H04L 5/0053; H04L 47/27
(Continued)

(56) References Cited

U.S. PATENT DOCUMENTS 7,650,559 B2 * 1/2010 Nishibayashi ........ H04W 99/00 714/776
8,898,532 B2 * 11/2014 Trainin ................ H04L 1/1685 714/748
(Continued)

FOREIGN PATENT DOCUMENTS

CN 106160983 A 11/2016

OTHER PUBLICATIONS

Seytnazarov et al., Enhanced Mathematical Modeling of Aggregation-Enabled WLANs with Compressed BlockACK, Jun. 2019, IEEE, vol. 18, No. 6, pp. 1260-1273. (Year: 2019).*
(Continued)

*Primary Examiner* — John J Tabone, Jr.
(74) *Attorney, Agent, or Firm* — Leydig, Voit & Mayer, Ltd.

(57) ABSTRACT

Embodiments of this disclosure relate to a wireless communication method, a device, a storage medium, and a computer program product. The method proposed herein includes: A receiving device generates a feedback frame in response to receiving of an aggregated frame, where the feedback frame includes first indication information and second indication information, the first indication information indicates a window size of a feedback window used to transmit the feedback frame, the window size is determined based on configuration information associated with the feedback window, and the second indication information indicates receiving status information of receiving the aggregated frame by the receiving device; and the receiving device sends the feedback frame to a sending device in the feedback window. This disclosure provides a frame structure of the block acknowledgment-based feedback frame, so that the feedback window used to transmit the feedback frame can be dynamically adjusted at a fine granularity.

20 Claims, 4 Drawing Sheets

(51) Int. Cl.

| | |
|---|---|
| ***H04L 1/1829*** | (2023.01) |
| ***H04L 1/1867*** | (2023.01) |
| ***H04L 5/00*** | (2006.01) |
| ***H04L 47/27*** | (2022.01) |

(52) U.S. Cl.

CPC .......... *H04L 1/1671* (2013.01); *H04L 1/1864* (2013.01); *H04L 1/1896* (2013.01); *H04L 5/0053* (2013.01); *H04L 47/27* (2013.01)

(58) Field of Classification Search

USPC ................................. 714/748, 749, 750, 821

See application file for complete search history.

(56) References Cited

U.S. PATENT DOCUMENTS

| | | | | |
|---|---|---|---|---|
| 11,395,335 | B2 * | 7/2022 | Lou | H04W 74/0808 |
| 2005/0265297 | A1 * | 12/2005 | Nakajima | H04L 1/1887 714/748 |
| 2006/0018332 | A1 * | 1/2006 | Kakani | H04L 1/1621 370/428 |
| 2006/0104300 | A1 * | 5/2006 | Ho | H04L 1/1614 370/428 |
| 2006/0248429 | A1 * | 11/2006 | Grandhi | H04L 1/1664 714/749 |
| 2007/0110055 | A1 * | 5/2007 | Fischer | H04L 47/2475 370/428 |
| 2008/0133996 | A1 * | 6/2008 | Naka | H04L 1/1887 714/748 |
| 2013/0242816 | A1 | 9/2013 | He et al. | |
| 2019/0037058 | A1 | 1/2019 | Asterjadhi et al. | |
| 2020/0322111 | A1 * | 10/2020 | Mahajan | H04L 67/566 |
| 2025/0015926 | A1 * | 1/2025 | Han | H04L 1/1896 |

OTHER PUBLICATIONS

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band," IEEE Std 802.11a-1999, IEEE Computer Society, Institute of Electrical and Electronics Engineers, New York, New York, total 90 pages (Sep. 1999).

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band," IEEE Std 802.11b-1999, IEEE Computer Society, Institute of Electrical and Electronics Engineers, New York, New York, total 97 pages (Sep. 1999).

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 4: Further Higher Data Rate Extension in the 2.4 GHz Band," IEEE Std 802.11g-2003, IEEE Computer Society, Institute of Electrical and Electronics Engineers, New York, New York, total 77 pages (Jun. 2003).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Std 802.11n-2009, IEEE Computer Society, Institute of Electrical and Electronics Engineers, New York, New York, total 536 pages (Sep. 2009).

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 Ghz," IEEE Std 802.11ac-2013, IEEE Computer Society, Institute of Electrical and Electronics Engineers, New York, New York, total 425 pages (Dec. 2013).

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 1: Enhancements for High-Efficiency WLAN," IEEE Std 802.11ax-2021, IEEE Computer Society, Institute of Electrical and Electronics Engineers, New York, New York, total 767 pages (Feb. 2021).

* cited by examiner

COMMUNICATION METHOD, DEVICE, STORAGE MEDIUM, AND COMPUTER PROGRAM PRODUCT

CROSS-REFERENCE TO RELATED APPLICATIONS

This application is a continuation of International Application No. PCT/CN2022/082254, filed on Mar. 22, 2022, the disclosure of which is hereby incorporated by reference in its entirety.

TECHNICAL FIELD

Embodiments of this disclosure generally relate to the field of communication technologies, and more specifically, to a wireless communication method, a device, a storage medium, and a computer program product.

BACKGROUND

In a wireless communication system, data transmission is usually not completely reliable due to characteristics such as sudden change, multipath fading, and the like of a wireless channel. Therefore, for the data transmission, the system needs to use a feedback acknowledgment frame for acknowledgment. For example, the feedback acknowledgment frame may include acknowledgment (ACK) at a medium access control (MAC) layer, block acknowledgment (BA) at the MAC layer, and ACK at a physical (PHY) layer.

SUMMARY

Embodiments of this disclosure generally provide a wireless communication method, a device, a computer-readable storage medium, and a computer program product.

According to a first aspect of this disclosure, a wireless communication method is provided. In the method, a receiving device generates a feedback frame in response to receiving of an aggregated frame. The feedback frame includes first indication information and second indication information. The first indication information indicates a window size of a feedback window used to transmit the feedback frame. The window size is determined based on configuration information associated with the feedback window. The second indication information indicates receiving status information of receiving the aggregated frame by the receiving device. The receiving device sends the feedback frame to a sending device in the feedback window.

In a first implementation of the first aspect, the receiving device may determine a bit value corresponding to the window size, and generate the first indication information of the feedback frame based on the bit value.

In a second implementation of the first aspect, the receiving device may receive downlink control information; obtain, from the downlink control information, an indication field associated with a feedback type of the feedback frame; and determine the configuration information based on the indication field associated with the feedback type.

In a third implementation of the first aspect, a data amount of the feedback frame transmitted in the feedback window is 8, 16, 32, 64, 128, 256, or 512 bits.

In a fourth implementation of the first aspect, the receiving status information is indicated in a variable-length content field included in the second indication information.

In a fifth implementation of the first aspect, the aggregated frame includes a plurality of aggregated medium access control protocol data units.

In a sixth implementation of the first aspect, the feedback frame includes a block acknowledgment frame.

According to the method provided in the first aspect of this disclosure, a frame structure of the block acknowledgment-based feedback frame is introduced, so that the feedback window used to transmit the feedback frame can be dynamically adjusted frame by frame at a fine granularity.

According to a second aspect of this disclosure, a wireless communication method is provided. In the method, a sending device sends an aggregated frame; and the sending device receives a feedback frame in a feedback window used by a receiving device to transmit the feedback frame for the aggregated frame. The feedback frame includes first indication information and second indication information. The first indication information indicates a window size of the feedback window. The window size is determined based on configuration information associated with the feedback window. The second indication information indicates receiving status information of receiving the aggregated frame by the receiving device.

In a first implementation of the second aspect, the sending device may determine, based on an attribute of the aggregated frame, the configuration information associated with the feedback window; determine, based on the configuration information, an indication field that is in downlink control information and that is associated with a feedback type of the feedback frame; and send the downlink control information to the receiving device.

In a second implementation of the second aspect, the aggregated frame includes a plurality of aggregated medium access control protocol data units.

In a third implementation of the second aspect, the feedback frame includes a block acknowledgment frame.

According to the method provided in the second aspect of this disclosure, the size of the feedback window used to transmit the feedback frame can be dynamically adjusted frame by frame at a fine granularity, and resource utilization of a system can be further improved.

According to a third aspect of this disclosure, a receiving device is provided. The receiving device includes at least one processor and at least one memory including computer program code. The at least one memory and the computer program code may work with the at least one processor to enable the at least one processor to perform the method according to the first aspect of this disclosure.

According to a fourth aspect of this disclosure, a sending device is provided. The sending device includes at least one processor and at least one memory including computer program code. The at least one memory and the computer program code may work with the at least one processor to enable the at least one processor to perform the method according to the second aspect of this disclosure.

According to a fifth aspect of this disclosure, a computer-readable storage medium is provided. The computer-readable storage medium stores computer-executable instructions. When the computer-executable instructions are executed by a processor, the processor is enabled to perform the method according to the first aspect or the second aspect of this disclosure.

According to a sixth aspect of this disclosure, a computer program product is provided. The computer program product includes computer-executable instructions. When the computer-executable instructions are executed by a processor, the processor is enabled to perform the method according to the first aspect or the second aspect of this disclosure.

According to a seventh aspect of this disclosure, a communication apparatus is provided. The communication apparatus includes a transceiver unit and a processing unit. The processing unit is configured to generate a feedback frame in response to receiving of an aggregated frame. The feedback frame includes first indication information and second indication information. The first indication information indicates a window size of a feedback window used to transmit the feedback frame. The window size is determined based on configuration information associated with the feedback window. The second indication information indicates receiving status information of receiving the aggregated frame by the receiving device. The transceiver unit is configured to send the feedback frame to a sending device in the feedback window.

In a first implementation of the seventh aspect, the processing unit is further configured to: determine a bit value corresponding to the window size; and generate the first indication information of the feedback frame based on the bit value.

In a second implementation of the seventh aspect, the transceiver unit is further configured to receive downlink control information; and the processing unit is further configured to: obtain, from the downlink control information, an indication field associated with a feedback type of the feedback frame; and determine the configuration information based on the indication field associated with the feedback type.

In a third implementation of the seventh aspect, a data amount of the feedback frame transmitted in the feedback window is 8, 16, 32, 64, 128, 256, or 512 bits.

In a fourth implementation of the seventh aspect, the receiving status information is indicated in a variable-length content field included in the second indication information.

In a fifth implementation of the seventh aspect, the aggregated frame includes a plurality of aggregated medium access control protocol data units.

In a sixth implementation of the seventh aspect, the feedback frame includes a block acknowledgment frame.

According to an eighth aspect of this disclosure, a communication apparatus is provided. The communication apparatus includes a transceiver unit and a processing unit. The transceiver unit is configured to: send an aggregated frame; and receive a feedback frame in a feedback window used by a receiving device to transmit the feedback frame for the aggregated frame. The feedback frame includes first indication information and second indication information. The first indication information indicates a window size of the feedback window. The window size is determined based on configuration information associated with the feedback window. The second indication information indicates receiving status information of receiving the aggregated frame by the receiving device.

In a first implementation of the eighth aspect, the processing unit is configured to: determine, based on an attribute of the aggregated frame, the configuration information associated with the feedback window; and determine, based on the configuration information, an indication field that is in downlink control information and that is associated with a feedback type of the feedback frame. The transceiver unit is further configured to send the downlink control information to the receiving device.

In a second implementation of the eighth aspect, the aggregated frame includes a plurality of aggregated medium access control protocol data units.

In a third implementation of the eighth aspect, the feedback frame includes a block acknowledgment frame.

According to a ninth aspect of this disclosure, a communication apparatus is provided. The communication apparatus includes at least one processor. The at least one processor is configured to execute a computer program or instructions in a memory, so that the communication apparatus performs the method according to embodiments of the first aspect or the second aspect.

According to a tenth aspect of this disclosure, a communication apparatus is provided. The communication apparatus includes a processor, a transceiver, and a memory. The processor is configured to execute a computer program or instructions in the memory, so that the communication apparatus performs the method according to embodiments of the first aspect or the second aspect.

According to an eleventh aspect of this disclosure, a communication apparatus is provided. The communication apparatus includes a processor and a memory. The processor is configured to execute a computer program or instructions in the memory, so that the communication apparatus performs the method according to embodiments of the first aspect or the second aspect.

According to a twelfth aspect of this disclosure, another communication apparatus is provided. The communication apparatus includes an interface circuit and a logic circuit. The interface circuit may be understood as an input/output interface, and the logic circuit may be configured to run code instructions to perform the method according to embodiments of the first aspect or the second aspect.

BRIEF DESCRIPTION OF DRAWINGS

With reference to the accompanying drawings and the following detailed descriptions, the foregoing and other features, advantages, and aspects of embodiments of this disclosure become more apparent. In the accompanying drawings, same or similar reference numerals indicate same or similar elements.

DESCRIPTION OF EMBODIMENTS

Figure 1:
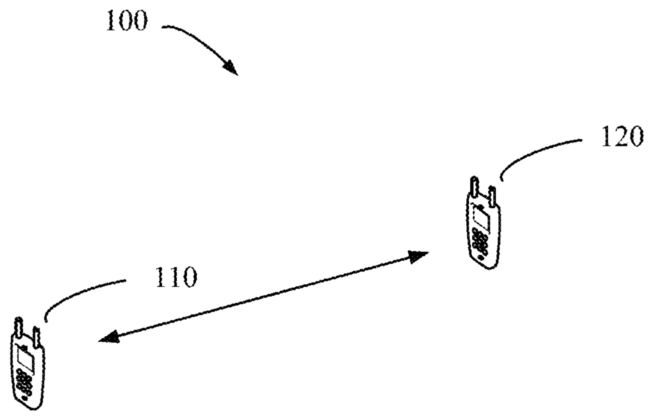
FIG. 1 is a schematic diagram of an example network environment in which an example embodiment of this disclosure may be implemented.

The following describes some example embodiments with reference to the accompanying drawings. Although example embodiments of this disclosure are shown in the accompanying drawings, it should be understood that this disclosure may be implemented in various forms, and should not be construed as being limited to embodiments described herein. On the contrary, these embodiments are provided so that this disclosure is thoroughly and completely understood. It should be understood that the accompanying drawings and embodiments of this disclosure are merely used as examples, but are not intended to limit the protection scope of this disclosure.

The terms "communication network" and "wireless network" used in this specification are networks that comply with any appropriate communication standard, such as long term evolution (LTE), advanced LTE (LTE-A), wideband code division multiple access (WCDMA), and high speed packet access (HSPA). In addition, communication between a terminal device and an access network device in a communication network may be performed according to any appropriate generation communication protocol, including but not limited to a first generation (1G), a second generation (2G), a 2.5G, a 2.75G, a third generation (3G), a fourth generation (4G), a 4.5G, a fifth generation (5G) communication protocol, and/or any other protocol that is currently known or to be developed in the future. Embodiments of this disclosure may be applied to various communication systems, including a cellular communication system and a non-cellular communication system. In view of rapid development of communication, certainly, there is a future type of communication technology and system that can embody this disclosure. Therefore, the scope of this disclosure should not be considered to be limited to the systems described above. For the purpose of description, embodiments of this disclosure are described with reference to a 5G communication system.

The terms "terminal device" and "user equipment" used in this specification are terminal devices that can perform wireless communication. By way of example and not limitation, the terminal device may also be referred to as a communication device, user equipment (UE), a subscriber station (SS), a portable subscriber station, a mobile station (MS), or an access terminal (AT). The terminal device may include but is not limited to a mobile phone, a cellular phone, a smartphone, an IP voice (VOIP) phone, a wireless local loop phone, a tablet computer, a wearable terminal device, a personal digital assistant (PDA), a portable computer, a desktop computer, an image capture terminal device (for example, a digital camera), a game terminal device, a music storage and playback device, a vehicle-mounted wireless terminal device, a wireless endpoint, a mobile station, laptop embedded equipment (LEE), a laptop mounted device (LME), a USB dongle, a smart device, wireless customer premises equipment (CPE), an internet of things (IoT) device, a watch or another wearable device, a head-mounted display (HMD), a vehicle, an unmanned aerial vehicle, a medical device and application (for example, remote surgery), an industrial device and application (for example, a robot and/or another wireless device operating in industrial and/or automated processing chain environments), a consumer electronic device, a device in a commercial wireless network and/or an industrial wireless network, and the like. In the following descriptions, the terms "terminal device", "communication device", "terminal", "user equipment", and "UE" may be used interchangeably.

The term "access network device" used in this specification includes but is not limited to a base station (BS), a gateway, a registration management entity, and another appropriate device in a communication system. The term "base station" or "BS" indicates a NodeB (or NB), an evolved NodeB (eNodeB or eNB), an NR (new radio) NB (also referred to as gNB), a remote radio unit (RRU), a radio head-end (RH), a remote radio head-end (RRH), a relay, a low power node (for example, femto, pico, or the like). In addition, the term "access network device" may be a central unit (CU) or a distributed unit (DU). In some example embodiments, the CU and the DU may be placed in different locations. For example, the CU is placed in a central equipment room, and the DU is placed in a heavy-traffic area. In some other example embodiments, the CU and the DU may alternatively be placed in a same location, for example, in different components of a same equipment room or a same rack.

The term "include" and variants thereof used in this specification indicate open inclusion, that is, "include but is not limited to". Unless otherwise stated, the term "or" indicates "and/or". The term "based on" indicates "at least partially based on". The terms "example embodiments" and "some embodiments" both indicate "at least one example embodiment". Other explicit and implicit definitions may also be included below.

With reference to FIG. 1 to FIG. 7, an example wireless communication process according to embodiments of this disclosure is described below.

FIG. 1 is a schematic diagram of an example network environment 100 in which an example embodiment of this disclosure may be implemented. As shown in FIG. 1, the network environment 100 may include a device 110 and a device 120 that can implement wireless communication transmission. In some embodiments, the device 110 may be referred to as a sending device 110 in wireless communication, and the device 120 may be referred to as a receiving device 120 in wireless communication. It should be understood that roles of the devices 110 and 120 may also be interchanged. To be specific, the device 120 is used as the sending device in wireless communication, and the device 110 is used as the receiving device in wireless communication. In the following, for ease of description, the device 110 is considered as the sending device 110 in wireless communication, and the device 120 is considered as the receiving device 120 in wireless communication.

In the network environment 100, the device 110 and the device 120 each may include but is not limited to a mobile phone, a cellular phone, a smartphone, a tablet computer, a tablet phone, a computer, a portable computer, a desktop computer, a personal digital assistant (PDA), a monitor, a computer monitor, a television, a tuner, an entertainment unit, a navigation device, a communication device, a fixed location data unit, a mobile location data unit, a radio, a satellite radio, a music player, a digital music player, a portable music player, a digital video player, and a video player, a digital video disc (DVD) player, a portable digital video player, or any other appropriate device that can support wireless communication.

It should be understood that the network environment 100 is merely an example, and does not imply any limitation on the scope of this disclosure. Embodiments of this disclosure may be further embodied in another network environment or architecture. In addition, it should be further understood that the network environment 100 may further include another element or entity for implementing communication connection, data transmission, and the like. For brief description, these elements or entities are not shown in FIG. 1, but it does not mean embodiments of this disclosure do not have them.

The network environment 100 in this embodiment of this disclosure may be a wireless network complying with any protocol that is currently known or to be developed in the future, including but not limited to a narrowband internet of things (NB-IoT) system, a global system for mobile communications (GSM) system, an enhanced data rate for GSM evolution (EDGE) system, a wideband code division multiple access (WCDMA) system, a code division multiple access 2000 (CDMA2000) system, a time division synchronization code division multiple access (TD-SCDMA) system, a long term evolution (LTE) system, and three application scenarios eMBB, URLLC, and eMTC in a 5G mobile communication system.

As described above, in a wireless communication system, data transmission is usually not completely reliable due to characteristics such as sudden change, multipath fading, and the like of a wireless channel. Therefore, for the data transmission, the system needs to use a feedback acknowledgment frame for acknowledgment. For example, the feedback acknowledgment frame may include acknowledgment (ACK) at a medium access control (MAC) layer, block acknowledgment (Block Ack) at the MAC layer, and ACK at a physical (PHY) layer.

In a mobile hotspot (Wi-Fi) communication system based on the 802.11abg protocol, a MAC frame sent by a sending end is usually a single MAC frame of a medium access control service data unit (MSDU) type. Each time the sending end sends such a MAC frame, an ACK frame is needed to acknowledge transmission of the MAC frame.

In the foregoing solution, because only a single MSDU MAC frame can be acknowledged, and the single MSDU is generally limited to only about 1500 bits due to an Ethernet MTU limitation, efficiency of a MAC layer in the entire system is poor. Even if a transmission rate of a physical layer can be provided, a throughput of the system cannot be greatly improved.

In a Wi-Fi communication system based on protocols such as 802.11n, 802.11ac, and 802.11ax, and the like, a MAC frame sent by a sending end is usually a MAC frame of an aggregated medium access control protocol data unit (AMPDU) type, and may be obtained by aggregating one or more medium access control protocol data units (MPDU). Each MPDU may include one or more MSDUs. A receiving end replies with a BA frame for each MAC AMPDU aggregated frame to perform acknowledgment.

In the foregoing solution, a data frame acknowledged by a BA acknowledgment window in the 802.11n and 802.11ac protocols is fixed at 64 bits. For a BA acknowledgment window in the 802.11ax, although support of 256 bits is added, only two types of 64 bits and 256 bits are supported. The 64 bits and the 256 bits are acknowledged in a BA session establishment phase, and do not dynamically change after a BA session is established. In this case, an adjustment granularity of the acknowledgment window is excessively coarse, and a size of the BA acknowledgment window cannot be adjusted more finely. Another problem is that BA feedback information cannot be dynamically adjusted. If a large acknowledgment window is used for BA at an initial stage, a same large acknowledgment window is still used even when a subsequent data amount decreases. However, a small quantity of aggregated frames can be acknowledged actually. Consequently, system efficiency is greatly reduced.

In addition, in wireless communication systems such as long term evolution (LTE) new radio (NR), and the like, at a sending end, after a MAC layer frame is aggregated, it is seen that only an entire transport block frame (TB FRAME) is transmitted at a PHY layer. The PHY layer performs ACK acknowledgment on the entire TB frame or on code block group (CBG) transport blocks that are obtained through division on the TB frame and that are for transmission.

In this solution, transmission overheads of an acknowledgment frame are small. However, a receiving end can only acknowledge the entire TB frame or the CBG transport blocks. Once a TB or CBG transport block is large, a transmission packet error rate increases, and consequently, retransmission efficiency may be low. In addition, in this solution, retransmission needs to be combined with a hybrid automatic repeat request (HARQ) to perform retransmission combination, so that a high transmission success rate of the physical layer can be achieved. However, HARQ implementation complexity and costs are high.

Therefore, a solution in which a size of the BA frame acknowledgment window can be dynamically adjusted frame by frame at a fine granularity is expected to be implemented. Therefore, the system efficiency is improved and a low transmission packet error rate is ensured.

Therefore, embodiments of this disclosure provide a wireless communication method. In the method, a receiving device generates a feedback frame in response to receiving of an aggregated frame. The feedback frame includes first indication information and second indication information. The first indication information indicates a window size of a feedback window used to transmit the feedback frame, and the window size may be determined based on configuration information associated with the feedback window. The second indication information indicates receiving status information of receiving the aggregated frame by the receiving device. The receiving device sends the feedback frame to a sending device in the feedback window. This disclosure provides a frame structure of the block acknowledgment-based feedback frame, so that the feedback window used to transmit the feedback frame can be dynamically adjusted at a fine granularity.

Figure 2:
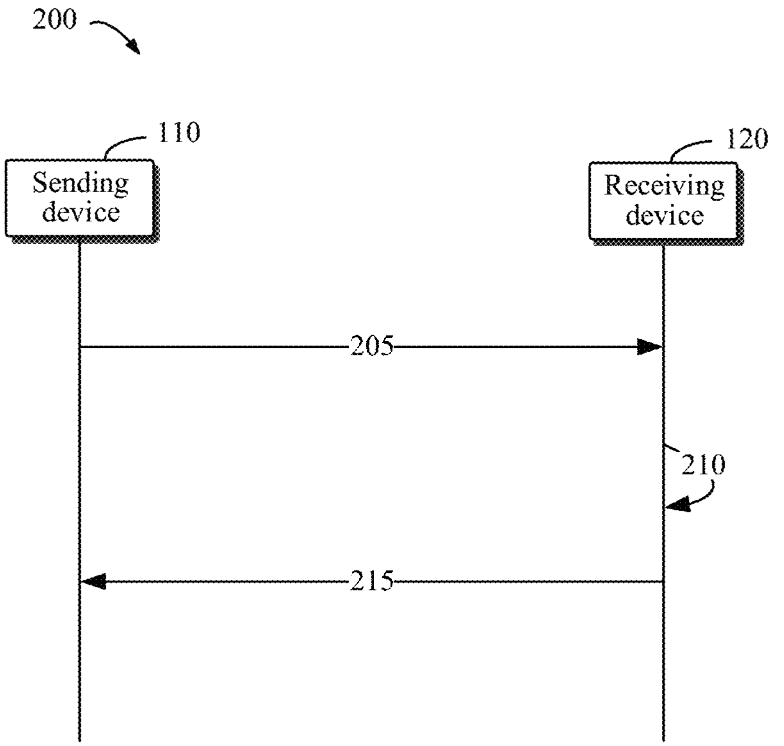
FIG. 2 is a diagram of signaling interaction for wireless communication according to an example embodiment of this disclosure.

FIG. 2 is a diagram of signaling interaction of a wireless communication process 200 according to an example embodiment of this disclosure. The example interaction process 200 may be related to the sending device 110 and the receiving device 120 shown in FIG. 1. For purposes of description, the process 200 is described below with reference to FIG. 1. It should be understood that the process is also applicable to another communication scenario and device.

As shown in FIG. 2, in 205, the sending device 110 sends an aggregated frame to the receiving device 120. In some embodiments, the aggregated frame may be a MAC AMPDU. It should be understood that the aggregated frame may alternatively include another aggregated frame in a communication protocol framework mentioned in embodiments of this disclosure.

In 210, the receiving device 120 generates a feedback frame for a receiving state of the aggregated frame. In some embodiments, the feedback frame may be a BA frame.

The feedback frame may include first indication information. The first indication information may indicate a window size of a feedback window used to transmit the feedback frame. The receiving device 120 may determine the window size of the feedback window based on configuration information associated with the feedback window.

In some embodiments, the first indication information may include a bit value corresponding to a data amount that can be carried by the window size of the feedback window. For example, the data amount of the feedback frame that can be transmitted in the feedback window may be set to 8, 16, 32, 64, 128, 256, or 512 bits, which may correspond to bit values 1 to 7 respectively. A field length occupied by the first indication information in the feedback frame may be 4 bits.

The feedback frame may further include second indication information. In some embodiments, the second indication information may indicate receiving status information of receiving the aggregated frame by the receiving device 120. The receiving status information may be included in a variable-length content field included in the second indication information.

In some embodiments, the receiving device 120 may, for example, dynamically obtain or determine the configuration information associated with the feedback window by using downlink scheduling signaling.

In some embodiments, the sending device may, for example, generate scheduling signaling by using the sent feedback frame. The scheduling signaling may be, for example, downlink control information (DCI). For example, the configuration information associated with the feedback window may be indicated, by the sending device, in an indication field that is in the DCI and that is associated with a feedback type of the feedback frame. The sending device may send the generated scheduling signaling to the receiving device 120.

The receiving device 120 may receive the DCI. The receiving device 120 may obtain, from the DCI, the indication field associated with the feedback type of the feedback frame, and further determine, based on the indication field, the configuration information associated with the feedback window. An example embodiment of the indication field that is in the DCI and that is associated with the feedback type of the feedback frame may be shown below.

TABLE 1

| Indication field associated with the feedback type of the feedback frame | | |
|---|---|---|
| Indication field name | Length (bit) | Meaning |
| ACK type | 4 | Corresponds to the first indication information in the feedback frame. |

As shown in Table 1, the indication field may be an ACK type field in the DCI, and a length of the indication field may be set to 4 bits. Content of the indication field may correspond to the first indication information in the feedback frame.

As shown in FIG. 2, in 215, after generating the feedback frame, the receiving device 120 may send the feedback frame to the sending device 110 in the determined feedback window.

Figure 3:
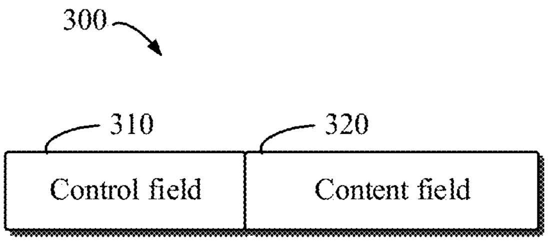
FIG. 3 is a schematic diagram of an example structure of a feedback frame according to an example embodiment of this disclosure.

With reference to FIG. 3, the following further describes an example of a feedback frame format provided in an embodiment of this disclosure. As shown in FIG. 3, a feedback frame 300 may include a control field (BA Control) 310 and a content field (BA INFO) 320. First indication information may be indicated in the control field 310, and second indication information may be indicated in the content field 320.

In some embodiments, an example embodiment of a format of the BA Control field may be shown below.

TABLE 2

| Format of the BA Control field | | |
|---|---|---|
| Field name | Length (bit) | Meaning |
| BA Control | 4 | Indicates a bitmap size, where values 1 to 7 indicate a window length 8, 16, 32, 64, 128, 256, or 512 bits respectively, a value 0 indicates single-frame aggregation, and other values are reserved (RESV). |

In some embodiments, an example embodiment of a format of the BA INFO field may be shown below.

TABLE 3

| Format of the BA INFO field | | |
|---|---|---|
| Field name | Length (bit) | Meaning |
| TID | 3 | Indicates a corresponding queue ID. |
| RESV | 5 | Indicates to be reserved. |
| SSN | 12 | Indicates a start MAC sequence. |
| Bitmap | 8 to 512 | Indicates a variable-length bit. |

It should be understood that, with reference to FIG. 3, Table 2 and Table 3, the described frame format of the feedback frame and the format of the control field and the format of the content field included in the feedback frame are merely used as an example embodiment of this disclosure. However, the frame format of the feedback frame and the format of the control field and the frame of the content field included in the feedback frame are not limited thereto. Another frame structure and field format that can carry the first indication information and the second indication information are also included in the protection scope of this disclosure.

According to the example embodiments of this disclosure described above, a frame structure of the BA-based feedback frame is implemented, so that the feedback window used to transmit the feedback frame can be dynamically adjusted at a fine granularity. In this manner, system efficiency can be significantly improved, and a low transmission packet error rate can be ensured.

It should be understood that although the foregoing descriptions include some specific implementation details, this should not be construed as limitations on the scope of any invention or claim, but rather as descriptions of specific example embodiments that may be specific to a specific invention. Some features described in this specification in the context of separate example embodiments may alternatively be integrated into a single example embodiment. Conversely, various features that are described in the context of a single example embodiment may alternatively be implemented separately in a plurality of example embodiments or in any appropriate sub-combination.

Figure 4:
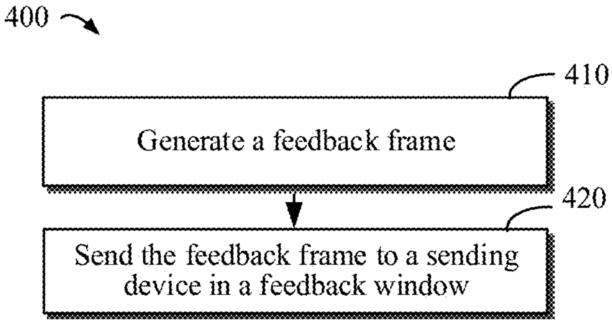
FIG. 4 is a flowchart of a wireless communication method according to an example embodiment of this disclosure.

FIG. 4 is a flowchart of a wireless communication method 400 according to an example embodiment of this disclosure. The method 400 may be implemented in the receiving device 120 shown in FIG. 1. For ease of description, the method 400 is described below with reference to FIG. 1. It should be understood that the method 400 is also applicable to another communication scenario and device.

In 410, a receiving device 120 generates a feedback frame in response to receiving of an aggregated frame. The feedback frame includes first indication information and second indication information. The first indication information indicates a window size of a feedback window used to transmit the feedback frame. The window size is determined based on configuration information associated with the feedback window. The second indication information indicates receiving status information of receiving the aggregated frame by the receiving device.

In 420, the receiving device sends the feedback frame to a sending device in the feedback window.

In some example embodiments, the receiving device may determine a bit value corresponding to the window size, and generate the first indication information of the feedback frame based on the bit value.

In some example embodiments, the receiving device may receive downlink control information, obtain, from the downlink control information, an indication field associated with a feedback type of the feedback frame, and determine the configuration information based on the indication field associated with the feedback type.

In some example embodiments, a data amount of the feedback frame transmitted in the feedback window is 8, 16, 32, 64, 128, 256, or 512 bits.

In some example embodiments, the receiving status information is indicated in a variable-length content field included in the second indication information.

In some example embodiments, the aggregated frame includes a plurality of aggregated medium access control protocol data units.

In some example embodiments, the feedback frame includes a block acknowledgment frame.

Figure 5:
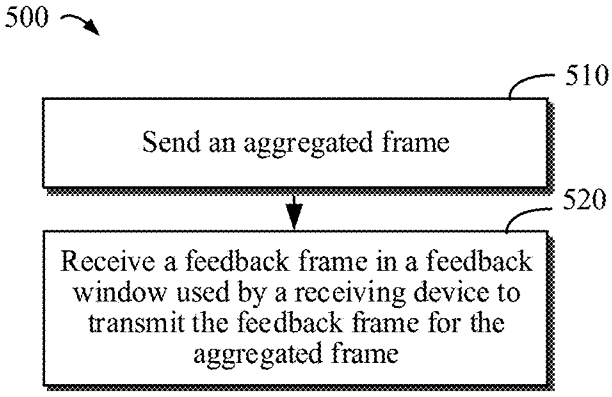
FIG. 5 is a flowchart of a wireless communication method according to an example embodiment of this disclosure.

FIG. 5 is a flowchart of a wireless communication method 500 according to an example embodiment of this disclosure. The method 500 may be implemented in the sending device 110 shown in FIG. 1. For ease of description, the method 500 is described below with reference to FIG. 1. It should be understood that the method 500 is also applicable to another communication scenario and device.

In 510, a sending device 110 sends an aggregated frame.

In 520, the sending device 110 receives a feedback frame in a feedback window used by a receiving device to transmit the feedback frame for the aggregated frame. The feedback frame includes first indication information and second indication information. The first indication information indicates a window size of the feedback window. The window size is determined based on configuration information associated with the feedback window. The second indication information indicates receiving status information of receiving the aggregated frame by the receiving device.

In some example embodiments, the sending device may determine, based on an attribute of the aggregated frame, the configuration information associated with the feedback window, determine, based on the configuration information, an indication field that is in downlink control information and that is associated with a feedback type of the feedback frame, and send the downlink control information to the receiving device.

In some example embodiments, the aggregated frame includes a plurality of aggregated medium access control protocol data units.

In some example embodiments, the feedback frame includes a block acknowledgment frame.

Figure 6:
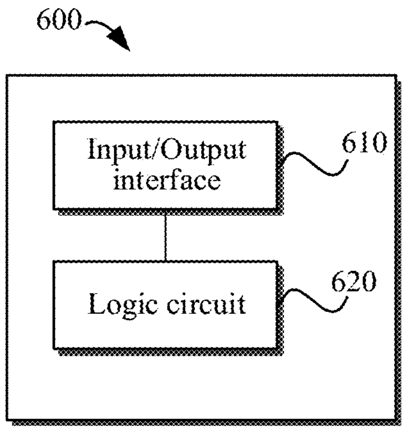
FIG. 6 is a block diagram of a communication apparatus according to an example embodiment of this disclosure.

FIG. 6 is a block diagram of a communication apparatus 600 according to an example embodiment of this disclosure. The communication apparatus 600 may be implemented as the sending device 110, the receiving device 120, a part of the foregoing devices, a chip in the foregoing devices, or the like shown in FIG. 1. It should be understood that the communication apparatus 600 is merely an example, and does not imply any limitation on the scope of this disclosure. This embodiment of this disclosure may be further embodied in different communication apparatuses. In addition, it should be further understood that the communication apparatus 600 may further include other elements, modules, or entities that are not shown for clarity, but this does not mean that this embodiment of this disclosure does not have these elements or entities. The scope of this disclosure is not limited in this respect.

As shown in FIG. 6, the communication apparatus 600 includes an input/output interface 610 and a logic circuit 620. The input/output interface 610 is coupled to the logic circuit 620. In this embodiment of this disclosure, the input/output interface 610 may be integrated together to implement receiving and sending functions, or may be used as an independent component to respectively implement as an input interface for receiving and an output interface for sending. For example, the input/output interface 610 shown in FIG. 6 is an example implementation of integration.

In an embodiment in which the communication apparatus 600 is implemented as the receiving device 120 shown in FIG. 1, the logic circuit 620 may be configured to generate a feedback frame in response to receiving of an aggregated frame. The feedback frame includes first indication information and second indication information. The first indication information indicates a window size of a feedback window used to transmit the feedback frame. The window size is determined based on configuration information associated with the feedback window. The second indication information indicates receiving status information of receiving the aggregated frame by the receiving device. The input/output interface 610 may be configured to send the feedback frame to a sending device in the feedback window.

In some example embodiments, the logic circuit 620 is further configured to: determine a bit value corresponding to the window size; and generate the first indication information of the feedback frame based on the bit value.

In some example embodiments, the input/output interface 610 may be configured to receive downlink control information; and the logic circuit 620 may be further configured to: obtain, from the downlink control information, an indication field associated with a feedback type of the feedback frame; and determine the configuration information based on the indication field associated with the feedback type.

In some example embodiments, a data amount of the feedback frame transmitted in the feedback window is 8, 16, 32, 64, 128, 256, or 512 bits.

In some example embodiments, the receiving status information is indicated in a variable-length content field included in the second indication information.

In some example embodiments, the aggregated frame includes a plurality of aggregated medium access control protocol data units.

In some example embodiments, the feedback frame includes a block acknowledgment frame.

In an embodiment in which the communication apparatus 600 is implemented as the sending device 110 shown in FIG. 1, the input/output interface 610 may be configured to: send an aggregated frame; and receive a feedback frame in a feedback window used by a receiving device to transmit the feedback frame for the aggregated frame. The feedback frame includes first indication information and second indication information. The first indication information indicates a window size of the feedback window. The window size is determined based on configuration information associated with the feedback window. The second indication information indicates receiving status information of receiving the aggregated frame by the receiving device.

In some example embodiments, the logic circuit 620 may be further configured to: determine, based on an attribute of the aggregated frame, the configuration information associated with the feedback window; and determine, based on the configuration information, an indication field that is in downlink control information and that is associated with a feedback type of the feedback frame. The input/output interface 610 may be further configured to send the downlink control information to the receiving device.

In some example embodiments, the aggregated frame includes a plurality of aggregated medium access control protocol data units.

In some example embodiments, the feedback frame includes a block acknowledgment frame.

It should be understood that the communication apparatus 600 in FIG. 6 can be configured to perform the processes implemented by the sending device 110 and the receiving device 120 in the foregoing embodiments with reference to FIG. 2 to FIG. 5. To avoid repetition, details are not described herein again.

Figure 7:
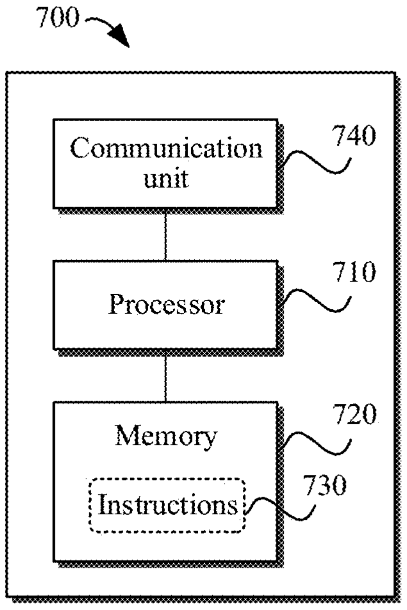
FIG. 7 is a block diagram of a communication apparatus according to an example embodiment of this disclosure.

FIG. 7 is a block diagram of a communication apparatus 700 that may implement some embodiments of this disclosure. The communication apparatus 700 can be configured to implement the sending device 110 and the receiving device 120 shown in FIG. 1. The communication apparatus 700 may alternatively be implemented as a chip or a chip system. It should be understood that the communication apparatus 700 is merely an example, and does not imply any limitation on the scope of this disclosure. This embodiment of this disclosure may be further embodied in different devices. It should be further understood that the communication apparatus 700 may further include other elements or entities that are not shown for ease of description, but this does not mean that this embodiment of this disclosure does not have these elements or entities.

As shown in FIG. 7, the communication apparatus 700 includes a processor 710, and the processor 710 controls an operation and a function of the communication apparatus 700. For example, in some example embodiments, the processor 710 may perform various operations by using instructions 730 stored in a memory 720 coupled to the processor 710. The memory 720 may be of any appropriate type applicable to a local technical environment, and may be implemented by using any appropriate data storage technology, including but not limited to a semiconductor-based storage device, a magnetic storage device and system, and an optical storage device and system. Although only one memory unit is shown in FIG. 7, there may be a plurality of physically different memory units in the communication apparatus 700. It should be understood that the processor 710 and the memory 720 may be disposed separately as independent components, or may be integrated together. This is not limited in this application.

The processor 710 may be of any appropriate type applicable to a local technical environment, and may include but is not limited to one or more of a general-purpose computer, a dedicated computer, a microcontroller, a digital signal processor (DSP), and a controller-based multi-core controller architecture. The communication apparatus 700 may include a plurality of processors, such as application-specific integrated circuit chips, where the chips belong, in terms of time, to a clock synchronized with a main processor. The processor 710 is coupled to a communication unit 740. The communication unit 740 may receive and send information by using a radio signal or by using an optical fiber, a cable, and/or another component.

The memory 720 may include one or more nonvolatile memories and one or more volatile memories. An example nonvolatile memory includes but is not limited to a read-only memory (ROM), an erasable programmable read-only memory (EPROM), a flash memory, a hard disk, a compact disc (CD), a digital versatile disc (DVD), or another magnetic storage and/or optical storage. An example volatile memory includes but is not limited to a random access memory (RAM), and the like.

This embodiment of this disclosure may be implemented by using a computer program, so that the communication apparatus 700 can perform any process described with reference to FIG. 2 to FIG. 5. This embodiment of this disclosure may alternatively be implemented by using hardware or a combination of software and hardware. The computer program includes the computer-executable instructions 730 executed by the processor 710. The computer program may be stored in the memory 720. The processor 710 may perform any appropriate action and processing by loading the computer program into the RAM.

In the foregoing embodiments in which the sending device 110 and the receiving device 120 determine, by using the machine learning algorithm module, the reinforcement learning model, and the like, to adjust the parameter, the module and model may be stored in the memory 720 in a manner of the computer program code or the instructions 730. The processor executes the program code or the instructions in the memory 720, so that the communication apparatus 700 performs the processing processes implemented by the sending device 110 and the receiving device 120 in FIG. 2 to FIG. 5.

In some embodiments, the computer program may be tangibly included in a computer-readable medium. The computer-readable medium may be included in the communication apparatus 700 (for example, in the memory 720) or another storage device that can be accessed by the communication apparatus 700. The computer program may be loaded from the computer-readable medium to the RAM for execution. The computer-readable medium may include any type of tangible nonvolatile memory, such as a ROM, an EPROM, a flash memory, a hard disk, a CD, a DVD, or the like.

Figure 8:
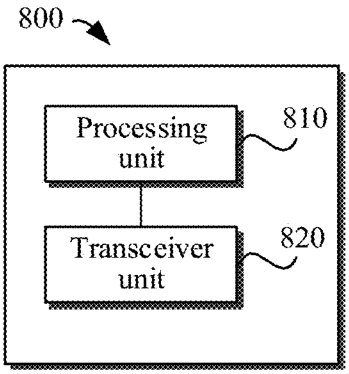
FIG. 8 is a block diagram of a communication apparatus according to an example embodiment of this disclosure.

FIG. 8 is a block diagram of a communication apparatus according to an example embodiment of this disclosure. As shown in FIG. 8, a communication apparatus 800 includes a processing unit 810 and a transceiver unit 820. The communication apparatus 800 is configured to implement the functions of the terminal device or the base station device in the method embodiments shown in FIG. 4 and FIG. 5. The processing unit 810 may perform internal processing. The transceiver unit 820 may communicate with the outside. The transceiver unit 820 may also be referred to as a communication interface, an input/output interface, or the like. For example, the transceiver unit 820 may include a sending unit and a receiving unit. The sending unit is configured to perform a sending operation of the terminal device or the base station device in the foregoing method embodiments. The receiving unit is configured to perform a receiving operation of the terminal device or the base station device in the foregoing method embodiments.

When the communication apparatus 800 is configured to implement the functions of the receiving device 120 in the method embodiment shown in FIG. 4, the processing unit 810 is configured to generate a feedback frame in response to receiving of an aggregated frame. The feedback frame includes first indication information and second indication information. The first indication information indicates a window size of a feedback window used to transmit the feedback frame. The window size is determined based on configuration information associated with the feedback window. The second indication information indicates receiving status information of receiving the aggregated frame by the receiving device. The transceiver unit 820 is configured to send the feedback frame to a sending device in the feedback window.

When the communication apparatus 800 is configured to implement the functions of the receiving device 120 in the method embodiment shown in FIG. 4, the processing unit 810 is configured to: determine a bit value corresponding to the window size; and generate the first indication information of the feedback frame based on the bit value.

When the communication apparatus 800 is configured to implement the functions of the receiving device 120 in the method embodiment shown in FIG. 4, the transceiver unit 810 is further configured to receive downlink control information. The processing unit 810 is configured to: obtain, from the downlink control information, an indication field associated with a feedback type of the feedback frame; and determine the configuration information based on the indication field associated with the feedback type.

When the communication apparatus 800 is configured to implement the functions of the receiving device 120 in the method embodiment shown in FIG. 4, a data amount of the feedback frame transmitted in the feedback window is 8, 16, 32, 64, 128, 256, or 512 bits.

When the communication apparatus 800 is configured to implement the functions of the receiving device 120 in the method embodiment shown in FIG. 4, the receiving status information is indicated in a variable-length content field included in the second indication information.

When the communication apparatus 800 is configured to implement the functions of the receiving device 120 in the method embodiment shown in FIG. 4, the aggregated frame includes a plurality of aggregated medium access control protocol data units.

When the communication apparatus 800 is configured to implement the functions of the receiving device 120 in the method embodiment shown in FIG. 4, the feedback frame includes a block acknowledgment frame.

When the communication apparatus 800 is configured to implement the functions of the sending device 110 in the method embodiment shown in FIG. 5, the transceiver unit 810 is configured to: send an aggregated frame; and receive a feedback frame in a feedback window used by a receiving device to transmit the feedback frame for the aggregated frame. The feedback frame includes first indication information and second indication information. The first indication information indicates a window size of the feedback window. The window size is determined based on configuration information associated with the feedback window. The second indication information indicates receiving status information of receiving the aggregated frame by the receiving device.

When the communication apparatus 800 is configured to implement the functions of the sending device 110 in the method embodiment shown in FIG. 5, the processing unit 820 is configured to: determine, based on an attribute of the aggregated frame, the configuration information associated with the feedback window; and determine, based on the configuration information, an indication field that is in downlink control information and that is associated with a feedback type of the feedback frame. The transceiver unit is further configured to send the downlink control information to the receiving device.

When the communication apparatus 800 is configured to implement the functions of the sending device 110 in the method embodiment shown in FIG. 5, the aggregated frame includes a plurality of aggregated medium access control protocol data units.

When the communication apparatus 800 is configured to implement the functions of the sending device 110 in the method embodiment shown in FIG. 5, the feedback frame includes a block acknowledgment frame.

For more detailed descriptions of the processing unit 810 and the transceiver unit 820, directly refer to the related descriptions in the method embodiments shown in FIG. 4 and FIG. 5. Details are not described herein again.

Figure 9:
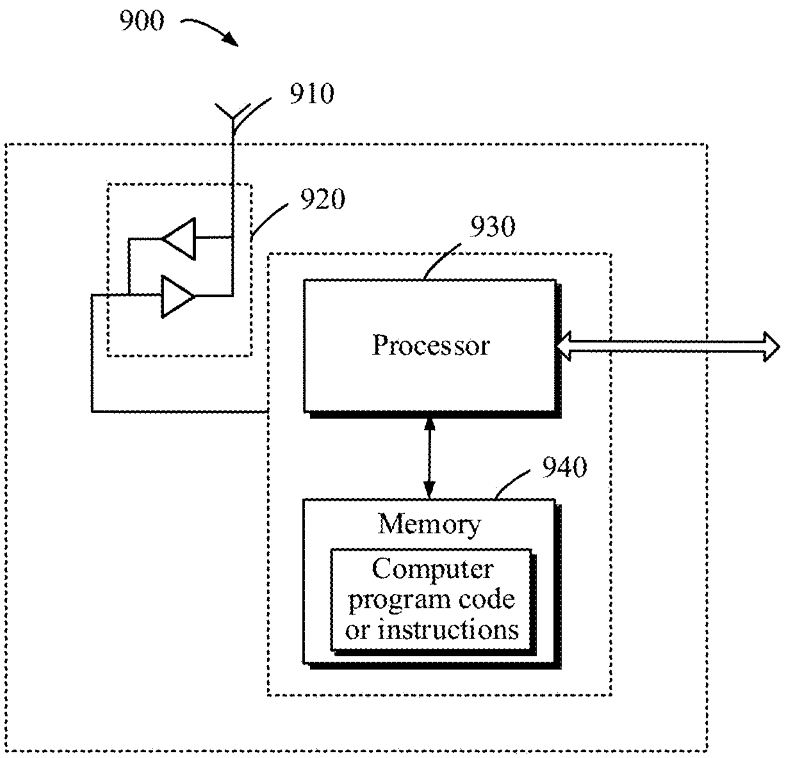
FIG. 9 is a block diagram of a communication apparatus according to an example embodiment of this disclosure.

FIG. 9 is a block diagram of a communication apparatus according to an example embodiment of this disclosure. As shown in FIG. 9, a possible schematic diagram of a base station device or a terminal device 900 is provided, including an antenna 910, a signal transceiver unit 920, a processor 930, and a memory 940. The memory 940 is configured to store computer program code, instructions, or the like. The processor 930 is configured to execute the program or the instructions, to implement the operations of the terminal device or the base station device in the method embodiments shown in FIG. 7 and FIG. 8. It may be understood that the signal transceiver unit may be a transceiver, including a transmitter and a receiver. The transmitter may send a signal to another device such as a base station device, a terminal device, or the like. The receiver may receive a signal from another device such as a core network, a base station device, a terminal device, or the like.

In general, various example embodiments of this disclosure may be implemented in hardware, a dedicated circuit, software, logic, or any combination thereof. Some aspects may be implemented in hardware, and other aspects may be implemented in firmware or software that may be performed by a controller, a microprocessor, or another computing device. When aspects of the example embodiments of this disclosure are illustrated or described as block diagrams, flowcharts, or represented by using some other figures, it is understood that the blocks, apparatuses, systems, techniques, or methods described herein may be implemented as non-limiting examples in hardware, software, firmware, a dedicated circuit or logic, general-purpose hardware or a controller, or another computing device, or some combinations thereof.

For example, the example embodiments of this disclosure may be described in a context of machine-executable or computer-executable instructions. The machine-executable instructions are included in, for example, a program module executed in a device on a real or virtual processor of a target. In general, the program module includes a routine, a program, a library, an object, a class, a component, a data structure, and the like, and performs a specific task or implements a specific abstract data structure. In various example embodiments, functions of program modules may be combined or split between the described program modules. The machine-executable instructions for the program module may be executed locally or in a distributed device. In the distributed device, the program module may be located in both a local storage medium and a remote storage medium.

Computer program code used to implement the methods in this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on the computer, partially on the computer, as an independent software package, partially on the computer and partially on a remote computer, or all on a remote computer or server.

In the context of this disclosure, the computer program code or related data may be carried by any appropriate carrier, so that a device, an apparatus, or a processor can perform various processing and operations described above. An example of the carrier includes a signal, a computer-readable medium, and the like. For example, an example of the signal may include propagating signals in electrical, optical, radio, sound, or other forms, such as carrier waves, infrared signals, and the like.

In the context of this disclosure, a machine-readable medium or the computer-readable medium may be any tangible medium that includes or stores a program for or has a program related to an instruction execution system, apparatus, or device. The machine-readable medium may be a machine-readable signal medium or a machine-readable storage medium. The machine-readable medium may include but is not limited to an electronic, a magnetic, an optical, an electromagnetic, an infrared, or a semiconductor system, apparatus, or device, or any appropriate combination thereof. A more detailed example of the machine-readable storage medium includes an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

In addition, although operations are described in a particular order, this should not be understood as requiring such operations to be completed in the particular order shown or in a successive order, or performing all the illustrated operations to obtain the desired results. In some cases, multitasking or parallel processing is advantageous. Similarly, although the foregoing descriptions include some specific implementation details, this should not be construed as limitations on the scope of any claim, but rather as descriptions of specific example embodiments. Some features described in this specification in the context of separate example embodiments may alternatively be integrated into a single example embodiment. Conversely, various features that are described in the context of a single example embodiment may alternatively be implemented separately in a plurality of example embodiments or in any appropriate sub-combination.

Although the subject matter has been described in language specific to structural features and/or methodological actions, it should be understood that the subject matter defined in the appended claims is not limited to the specific features or actions described above. Rather, the specific features and actions described above are disclosed as example forms of implementing the claims.

What is claimed is:

1. A wireless communication method, comprising:

generating, by a receiving device, a feedback frame in response to receiving of an aggregated frame, wherein the feedback frame comprises first indication information and second indication information, the first indication information indicates a window size of a feedback window used to transmit the feedback frame and occupies a field length of 4 bits in the feedback frame, the window size is determined based on configuration information associated with the feedback window and is dynamically adjusted frame by frame, the second indication information indicates receiving status information of receiving the aggregated frame by the receiving device; and sending, by the receiving device, the feedback frame to a sending device in the feedback window.

2. The method according to claim 1, wherein the generating the feedback frame comprises:

determining a bit value corresponding to the window size; and generating the first indication information of the feedback frame based on the bit value.

3. The method according to claim 2, further comprising:

receiving downlink control information;

obtaining, from the downlink control information, an indication field associated with a feedback type of the feedback frame; and determining the configuration information based on the indication field associated with the feedback type.

4. The method according to claim 1, wherein a data amount of the feedback frame transmitted in the feedback window is 8, 16, 32, 64, 128, 256, or 512 bits.

5. The method according to claim 1, wherein the receiving the status information is indicated in a variable-length content field comprised in the second indication information.

6. The method according to claim 1, wherein the aggregated frame comprises a plurality of aggregated medium access control protocol data units.

7. The method according to claim 1, wherein the feedback frame comprises a block acknowledgment frame.

8. A wireless communication method, comprising:

sending, by a sending device, an aggregated frame; and receiving, by the sending device, a feedback frame in a feedback window used by a receiving device to transmit the feedback frame for the aggregated frame, wherein the feedback frame comprises first indication information and second indication information, the first indication information indicates a window size of the feedback window and occupies a field length of 4 bits in the feedback frame, the window size is determined based on configuration information associated with the feedback window and is dynamically adjusted frame by frame, and the second indication information indicates receiving status information of receiving the aggregated frame by the receiving device.

9. The method according to claim 8, further comprising:

determining, based on an attribute of the aggregated frame, the configuration information associated with the feedback window;

determining, based on the configuration information, an indication field that is in downlink control information and that is associated with a feedback type of the feedback frame; and sending the downlink control information to the receiving device.

10. The method according to claim 8, wherein the aggregated frame comprises a plurality of aggregated medium access control protocol data units.

11. The method according to claim 8, wherein the feedback frame comprises a block acknowledgment frame.

12. A communication device, comprising:

a transceiver and a processor coupled to the transceiver, wherein the processor is configured to perform the method according to claim 1.

13. A communication device, comprising:

a transceiver and a processor coupled to the transceiver, wherein the processor is configured to perform the method according to claim 8.

14. A receiving device, comprising:

a processor, configured to generate a feedback frame in response to receiving of an aggregated frame, wherein the feedback frame comprises first indication information and second indication information, the first indication information indicates a window size of a feedback window used to transmit the feedback frame and occupies a field length of 4 bits in the feedback frame, the window size is determined based on configuration information associated with the feedback window and is dynamically adjusted frame by frame, the second indication information indicates receiving status information of receiving the aggregated frame by the receiving device; and a transceiver, coupled to the processor and configured to cooperate with the processor to send the feedback frame to a sending device in the feedback window.

15. The receiving device according to claim 14, wherein in generating the feedback frame, the processor is further configured to:

determine a bit value corresponding to the window size; and generate the first indication information of the feedback frame based on the bit value.

16. The receiving device according to claim 15, the processor is further configured to:

receive downlink control information;

obtain, from the downlink control information, an indication field associated with a feedback type of the feedback frame; and determine the configuration information based on the indication field associated with the feedback type.

17. The receiving device according to claim 14, wherein a data amount of the feedback frame transmitted in the feedback window is 8, 16, 32, 64, 128, 256, or 512 bits.

18. The receiving device according to claim 14, wherein the receiving the status information is indicated in a variable-length content field comprised in the second indication information.

19. The receiving device according to claim 14, wherein the aggregated frame comprises a plurality of aggregated medium access control protocol data units.

20. The receiving device according to claim 14, wherein the feedback frame comprises a block acknowledgment frame.

* * * * *